US011370667B2

(12) United States Patent
Nasu et al.

(10) Patent No.: US 11,370,667 B2
(45) Date of Patent: Jun. 28, 2022

(54) SILICATE MIXTURE AND COMBUSTION ACCELERATOR USING THE SAME

(71) Applicant: Yushin Co. Ltd., Yamagata (JP)

(72) Inventors: Makoto Nasu, Yamagata (JP); Kaoru Yoshida, Yamagata (JP); Kuriko Nishimoto, Yamagata (JP)

(73) Assignee: YUSHIN CO. LTD., Yamagata (JP)

( * ) Notice: Subject to any disclaimer, the term of this patent is extended or adjusted under 35 U.S.C. 154(b) by 309 days.

(21) Appl. No.: 16/492,814

(22) PCT Filed: Mar. 9, 2018

(86) PCT No.: PCT/JP2018/009355
§ 371 (c)(1),
(2) Date: Sep. 10, 2019

(87) PCT Pub. No.: WO2018/164279
PCT Pub. Date: Sep. 13, 2018

(65) Prior Publication Data

US 2020/0071173 A1 Mar. 5, 2020

(30) Foreign Application Priority Data

Mar. 10, 2017 (JP) ............................ JP2017-046803

(51) Int. Cl.
*C01B 33/20* (2006.01)
*C10L 1/12* (2006.01)
(Continued)

(52) U.S. Cl.
CPC ........ *C01B 33/20* (2013.01); *C04B 35/62222* (2013.01); *C10L 1/1291* (2013.01);
(Continued)

(58) Field of Classification Search
CPC ..... C01B 33/20; F23K 5/10; C04B 35/62222; C10L 1/1291; C10L 2230/20;
(Continued)

(56) References Cited

U.S. PATENT DOCUMENTS 2,978,360 A * 4/1961 Bradstreet .............. F02B 51/02 123/669
3,003,857 A * 10/1961 Carls, Jr. .................. C10L 1/10 44/320
(Continued)

FOREIGN PATENT DOCUMENTS

JP 2008038884 A 2/2008
JP 2009074528 A 4/2009
(Continued)

OTHER PUBLICATIONS

"JP_2008038884_A_M—Machine Translation.pdf", machine translation, JPlatPat, Sep. 9, 2021. (Year: 2021).*
(Continued)

*Primary Examiner* — Steven B McAllister
*Assistant Examiner* — Daniel E. Namay
(74) *Attorney, Agent, or Firm* — Lucas & Mercanti, LLP

(57) ABSTRACT

A silicate mixture and a combustion accelerator increase combustion efficiency in a combustion engine. The silicate mixture is formed by mixing a first component including one or two or more materials selected from silicon compounds including silicon, glass, and quartz, and a second component including one or two or more materials selected from materials formed by sintering a silicate mineral at a temperature of 1300° C. or higher and 2000° C. or lower and ores emitting a terahertz wave.

7 Claims, 7 Drawing Sheets

10 20 20 11 12 21 13 50 31 51

(51) Int. Cl.
*F02N 19/00* (2010.01)
*F02B 77/02* (2006.01)
*C04B 35/622* (2006.01)
*F23K 5/10* (2006.01)

(52) U.S. Cl.
CPC ............ *F02B 77/02* (2013.01); *F02N 19/001* (2013.01); *F23K 5/10* (2013.01); *C10L 2230/20* (2013.01); *C10L 2230/22* (2013.01); *F02N 2019/002* (2013.01)

(58) Field of Classification Search
CPC .... C10L 2230/22; F02B 77/02; F02N 19/001; F02N 2019/002
USPC .................................................. 44/603; 431/4
IPC .......... C01B 33/20; C04B 35/622; C10L 1/12; F02B 77/02,19/00; F23K 5/10
See application file for complete search history.

(56) References Cited

U.S. PATENT DOCUMENTS 3,434,977 A * 3/1969 Neugebauer ......... B01J 13/0086 252/1
3,472,787 A * 10/1969 Kucirka .................. C01B 33/20 502/204
3,734,781 A * 5/1973 Smatko ............... H01M 50/431 429/251
4,067,695 A * 1/1978 Miyaguchi ............. G01N 27/12 338/34
5,795,840 A * 8/1998 Takami ................. F01N 3/0835 502/334
2013/0040082 A1* 2/2013 Mascia ............... C04B 35/6316 428/34.1

FOREIGN PATENT DOCUMENTS

| | | | |
|---|---|---|---|
| JP | 2012158684 | A | 8/2012 |
| JP | 2014217348 | A | 11/2014 |
| JP | 2015199894 | A | 11/2015 |
| JP | 2015201417 | A | 11/2015 |
| JP | 2018027885 | A | 2/2018 |
| WO | 02/079093 | A1 | 10/2002 |
| WO | 2007101643 | A1 | 9/2007 |

OTHER PUBLICATIONS

"JP_2009074528_A_M—Machine Translation.pdf", machine translation, JPlatPat, Sep. 9, 2021. (Year: 2021).*
"WO_02079093_A1_M—Machine Translation.pdf", machine translation, EPO.org, Sep. 9, 2021. (Year: 2021).*
International Search Report dated May 22, 2018 for PCT/JP2018/009355 and English translation.

* cited by examiner

FIG. 4

Inspection Report of Exhaust Emission from Spark-ignition Engine Vehicle with Steady-state Mode Method

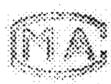

Qualification License Number: 201510022244X Inspection Report Number 321000574012017010613584

Inspection Station Name: Yangzhou Binjiang Vehicle Inspection Co., Ltd. Inspection Date: January 6, 2017 13:58:44-14:01:18

Inspection Operator: Feng Zhou Inspection Driver: Xiu Xu

1. Vehicle Information Line Number: Line 2

License Plate Number: Gui BG6990 Vehicle Identification Number: [illegible]

Vehicle Model: Red Flag CA7165AT4 Manufacturer: China FAW Group Co., Ltd.

Date of Registration: December 30, 2010 Gross Vehicle Mass: 1775 kg

Reference Mass: 1425 kg Fuel Form: Closed-loop EFI

Driving Method: Front Wheel Drive Driving Tire Pressure: Normal

Transmission Form: Manual Gear Number: 5

Engine Model: BWH Engine Displacement: 1.6 ml

Cylinder Number: 4 Catalytic Converter: Yes

Oxygen Sensor: Yes Mono Fuel/Dual Fuel: Mono Fuel

Cumulative Mileage: 60001 km

Name and Contact information of Vehicle Owner: ███ / ███

2. Inspection Basis GB18285-2005、DB32/966-2006

3. Inspection device:

Device Authentication Code: 20161122 Computer System Integrator: Shenzhen Anche Technologies Co., Ltd.

Chassis Dynamometer: ACCG-10 Manufacturer: Shenzhen Anche Technologies Co., Ltd.

Exhaust Analyzer: MQW-50A Manufacturer: Zhejiang University MingTrun Technology Co., Ltd.

4. Environmental Conditions of Inspection:

Temperature: 11.6 ℃ Atmospheric Pressure: 102.4 kPa Relative Humidity: 74.4

5. Inspection Results and Judgment:

| Exhaust Emission Items | HC | | CO | | NO | |
|---|---|---|---|---|---|---|
| | $10^{-6}$ | | % | | $10^{-6}$ | |
| | ASM5025 | ASM2540 | ASM5025 | ASM2540 | ASM5025 | ASM2540 |
| Inspection Results | 23 | | 0.02 | | 1842 | |
| Emission Limits | 190 | | 1.1 | | 1500 | |
| Decision Results | Qualified | — | Qualified | — | Unqualified | — |
| Judgment | Fail to pass | | | | | |

Report Reviewer: [signature] Report Approver: [signature]

Statements: 1. The above report form is valid only for this inspection; 2. The inspection report is invalid without signature and seal.

Address of Inspection Station: Huanghai South Road, Jiangdu District, Yangzhou City Tel: 0514-86337999

Seal:

FIG. 5

Inspection Report of Exhaust Emission from Spark-ignition Engine Vehicle with Steady-state Mode Method

MA

Qualification License Number: 20151002244X  Inspection Report Number: 3210005740220170106143529

Inspection Station Name: Yangzhou Binjiang Vehicle Inspection Co., Ltd.  Inspection Date: January 6, 2017 14:35:29-14:39:50

Inspection Operator: Feng Zhou  Inspection Driver: Hao Zhu

1. Vehicle Information  Line Number: Line 1

License Plate Number: Gui BG6990  Vehicle Identification Number: LFPH3ACC0A1D06460

Vehicle Model: Red Flag CA7165AT4  Manufacturer: China FAW Group Co., Ltd.

Date of Registration: December 30, 2010  Gross Vehicle Mass: 1775 kg

Reference Mass: 1425 kg  Fuel Form: Closed-loop EFI

Driving Method: Front Wheel Drive  Driving Tire Pressure: Normal

Transmission Form: Manual  Gear Number: 5

Engine Model: BWH  Engine Displacement: 1.6 ml

Cylinder Number: 4  Catalytic Converter: Yes

Oxygen Sensor: Yes  Mono Fuel/Dual Fuel: Mono Fuel

Cumulative Mileage: 60003 km

Name and Contact information of Vehicle Owner:

2. Inspection Basis  GB18285-2005、DB32/966-2006

3. Inspection device:

Device Authentication Code: 20151122  Computer System Integrator: Shenzhen Anche Technologies Co., Ltd.

Chassis Dynamometer: ACCG-10  Manufacturer: Shenzhen Anche Technologies Co., Ltd.

Exhaust Analyzer: MQW-50A  Manufacturer: Zhejiang University MingTrun Technology Co., Ltd.

4. Environmental Conditions of Inspection:

Temperature: 11.4 ℃  Atmospheric Pressure: 102.2 kPa  Relative Humidity: 74.4 %

5. Inspection Results and Judgment:

| Exhaust Emission Items | HC $10^{-6}$ | | CO % | | NO $10^{-6}$ | |
|---|---|---|---|---|---|---|
| | ASM5025 | ASM2540 | ASM5025 | ASM2540 | ASM5025 | ASM2540 |
| Inspection Results | 23 | 16 | 0.04 | 0.03 | 1354 | 588 |
| Emission Limits | 190 | 190 | 1.1 | 1.2 | 1500 | 1350 |
| Decision Results | Qualified | Qualified | Qualified | Qualified | Qualified | Qualified |
| Judgment | Pass | | | | | |

Report Reviewer:  Report Approver:

Statements: 1. The above report form is valid only for this inspection; 2. The inspection report is invalid without signature and seal.

Address of Inspection Station: Huanghai South Road, Jiangdu District, Yangzhou City  Tel: 0514-86337999

Seal:

Diesel Automobile 10·15 Mode Emission Gas Test Result Report

Test date: November 7, 2017

Testing agency: Japan Automobile Transport Technology Association

◎ Testing automobile

Car name·model (classification) Mazda · LDA-DJ5FS

Frame number DJ5FS-153443 (Yamagata 501Hi8332) Use: for riding

Traveling kilometers 12441 km

Vehicle weight 1080 kg

Total vehicle weight 1355 kg

Testing automobile weight 1190 kg

Equivalent inertia weight (set value) 1250 kg

Prime mover type S5 Maximum power output 102(138.64)/3425 kW(PS)/min⁻¹

Cycle 4 Cylinders 4 Total displacement 1.498 L

Transmission: ~~automatic~~ ~~semi-automatic~~ manual front 6-speed

Speed reduction ratio 3.850

Fuel used: light oil (density: 0.820 g/cm³ (temperature: 26.0°C))

Driving wheel tire air pressure (standard) 260 kPa

Driving wheel tire air pressure (found) 260 kPa

◎ Test device

Chassis Dynamometer (DC/DV) ONO SOKKI CO., LTD. Type ZA-018

Blower (vehicle speed proportional type) Type #11

○ Emission gas and particulate material measuring equipment

Emission gas analyzer HORIBA, Ltd. Type MEXA-7200D

CVS device (CFV) HORIBA, Ltd. Type CVS-9300T (collection amount 15 m³/min)

Diluting tunnel HORIBA, Ltd. Type DLT-1240W Precision balance METTLER TOLEDO Type UMX2

◎ Filter soak record

Soak time before test: 24 hours (from 10:30 on day 6 to 10:30 on day 7)

Soak time after test 1 hour (from 11:15 to 12:40 on day 7)

Weighing room temperature highest value of 22.2°C to lowest value of 21.8°C Weighing room humidity maximum value of 46% to minimum value of 44%

◎ Test results

Driving time: from 10:50 at start to 11:05 at end

Test room dry bulb temperature: 24.6°C before start to 25.1°C after end

Test room wet bulb temperature: 17.6°C before start to 18.0°C after end

Dilution rate (DF) 61.207

Fuel consumption rate 20.9 km/L

Test room atmospheric temperature 100.9 kPa

Test room relative humidity 50 %

Humidity correction factor (KH) 0.984

Diluted emission gas amount (Vmix) 39866 L/km

○ Emission gas

| Emission gas components | Diluted emission gas concentration A | Diluted air concentration B | Net concentration A−(B×(1−1/DF)) | Emission amount |
|---|---|---|---|---|
| CO (NDIR) | 2.24 ppm | 0.76 ppm | 1.49 ppm | 0.069 g/km |
| HC (HFID) | 3.95 ppmC | 2.53 ppmC | 1.46 ppmC | 0.033 g/km |
| NOx (CLD) | 8.21 ppm | 0.04 ppm | 8.17 ppm | 0.612 g/km |
| $CO_2$ (NDIR) | 0.217 % | 0.045 % | 0.172 % | 125.7 g/km |

○ Particulate material

Collection efficiency of PM (η) 99.3 %

Correction of collection mass of PM

Change in mass of correction filter −2 μg Ratio to minimum collection mass required −0.6 %

| Diluted emission gas | | | Diluted air | | | Net concentration |
|---|---|---|---|---|---|---|
| Collection mass PMp | Sample flow rate Vp | Concentration A=PMp/Vp | Collection mass PMb | Sample flow rate Vb | Concentration B=PMb/Vd | A−(B×(1−1/DF)) |
| 563 μg | 824 L | 0.6833 μg/L | —— μg | —— L | —— μg/L | 0.6833 μg/L |
| | | | | | Emission amount | 0.027 g/km |

◎ Remarks Normal Rotational speed under no load 800 min⁻¹ · Spraying time Electronic type

| Divergence prevention device of carbon monoxide and the like | Type | ternary catalyst | oxidation catalyst | EGR | —— | —— | —— |
|---|---|---|---|---|---|---|---|
| | Number | —— | 1 | 2 | —— | —— | —— |
| | Name of manufacturer | —— | original maker | original maker | —— | —— | —— |

(Note) The name of manufacturer is written in the following manner.

① In the case that mounting of the divergence prevention device of carbon monoxide and the like was performed by a car maker of the country of origin, "original maker" is written.

② In the case other than the case ①, the name of manufacture of the corresponding device (this may be abbreviated) is written.

○ One fuel injection (common Rail injection)

Diesel Automobile 10·15 Mode Emission Gas Test Result Report

Test date: November 7, 2017

Testing agency: Japan Automobile Transport Technology Association

◎ Testing automobile

Car name model (classification) Mazda · LDA-DJ5FS

Prime mover type S5 Maximum power output 102(136.54)/3425 kW(PS)/min⁻¹

Frame number DJ5FS-153443 (Yamagata 501Hi8332) Use: for riding

Cycle 4 Cylinders 4 Total displacement 1.498 L

Traveling kilometers 12480 km

Transmission: ~~automatic~~ ~~semi-automatic~~ manual front 6-speed

Vehicle weight 1080 kg

Speed reduction ratio 3.850

Total vehicle weight 1355 kg

Fuel used: light oil (density: 0.820 g/cm³ (temperature: 26° C))

Testing automobile weight 1190 kg

Driving wheel tire air pressure (standard) 260 kPa

Equivalent inertia weight (set value) 1250 kg

Driving wheel tire air pressure (found) 260 kPa

◎ Test device

Chassis Dynamometer (DC/DV) ONO SOKKI CO., LTD. Type ZA-018

Blower (vehicle speed proportional type) Type #11

○ Emission gas and particulate material measuring equipment

Emission gas analyzer HORIBA, Ltd. Type MEXA-7200D

CVS device (CFV) HORIBA, Ltd. Type CVS-9300T (collection amount 15 m³/min)

Diluting tunnel HORIBA, Ltd. Type DLT-1240W Precision balance METTLER TOLEDO Type UMX2

◎ Filter soak record

Soak time before test 28 hours (from 10:30 on day 6 to 14:06 on day 7)

Soak time after test 1 hour (from 14:51 to 16:15 on day 7)

Weighing room temperature highest value of 22.2° C to lowest value of 21.8° C Weighing room humidity maximum value of 46% to minimum value of 44%

◎ Test results

Driving time: from 14:26 at start to 14:41 at end

Test room atmospheric temperature 100.8 kPa

Test room dry bulb temperature: 27.5° C before start to 25.7° C after end

Test room relative humidity 46 %

Test room wet bulb temperature: 17.5° C before start to 19.6° C after end

Humidity correction factor (KH) 0.986

Dilution rate (DF) 61.820

Diluted emission gas amount (Vmix) 39712 L/km

Fuel consumption rate 21.2 km/L

○ Emission gas

| Emission gas components | Diluted emission gas concentration A | Diluted air concentration B | Net concentration A−(B×(1−1/DF)) | Emission amount |
|---|---|---|---|---|
| CO (NDIR) | 1.22 ppm | 0.66 ppm | 0.57 ppm | 0.026 g/km |
| HC (HFID) | 3.91 ppmC | 2.55 ppmC | 1.40 ppmC | 0.032 g/km |
| NOx (CLD) | 9.38 ppm | 0.03 ppm | 9.35 ppm | 0.699 g/km |
| $CO_2$ (NDIR) | 0.215 % | 0.045 % | 0.171 % | 124.1 g/km |

○ Particulate material

Collection efficiency of PM (η) 99.2 %

Correction of collection mass of PM

Change in mass of correction filter 0 μg Ratio to minimum collection mass required 0.0 %

| Diluted emission gas | | | Diluted air | | | Net concentration A−(B×(1−1/DF)) |
|---|---|---|---|---|---|---|
| Collection mass PMp | Sample flow rate Vp | Concentration A=PMp/Vp | Collection mass PMb | Sample flow rate Vb | Concentration B=PMb/Vd | |
| 372 μg | 824 L | 0.4516 μg/L | —— μg | —— L | —— μg/L | 0.4516 μg/L |
| | | | | | Emission amount | 0.017 g/km |

◎ Remarks Normal Rotational speed under no load 800 min⁻¹ · Spraying time Electronic type

| Divergence prevention device of carbon monoxide and the like | Type | ternary catalyst | oxidation catalyst | EGR | —— | —— | —— |
|---|---|---|---|---|---|---|---|
| | Number | —— | 1 | 2 | —— | —— | —— |
| | Name of manufacturer | —— | original maker | original maker | —— | —— | —— |

(Note) The name of manufacturer is written in the following manner.

① In the case that mounting of the divergence prevention device of carbon monoxide and the like was performed by a car maker of the country of origin, "original maker" is written.

② In the case other than the case ①, the name of manufacture of the corresponding device (this may be abbreviated) is written.

○ One fuel injection (common Rail injection)

SILICATE MIXTURE AND COMBUSTION ACCELERATOR USING THE SAME

CROSS REFERENCE TO RELATED APPLICATION

This Application is a 371 of PCT/JP2018/009355 filed on Mar. 9, 2018 which, in turn, claimed the priority of Japanese Patent Application No. 2017-046803 filed on Mar. 10, 2017, both applications are incorporated herein by reference.

TECHNICAL FIELD

The present invention relates to a silicate mixture using a silicate mineral and a combustion accelerator using the same.

BACKGROUND ART

Recently, an electromagnetic wave in a terahertz frequency range (hereinafter, referred to as a terahertz wave) has received much attention. An electromagnetic wave in a frequency range of 0.1 or more and 100 THz or less (terahertz wave) has a light condensing property in which light goes straight and transparency to various objects such as a ceramic, a plastic, and paper. Therefore, the terahertz wave is applied to various fields such as spectroscopy, biomedicine, security, and imaging, using these characteristics. In recent years, technology which uses the terahertz wave in various fields has also been suggested.

For example, Patent Literature 1 (JP 2015-199894 A) suggests a fuel consumption improving agent including activated water, which irradiates resonance electromagnetic waves with a frequency of 32 to 38 terahertz, thereby using itself as a transfer oscillator of the electromagnetic waves. This literature discloses that activated water containing hydrogen ions is added to fuel oil, thereby burning and exploding hydrogen ions having a specific thrust of about 200 times that of hydrogen gas with the fuel oil in a combustion chamber, and it is attempted to increase torque by the specific thrust at the time of explosion of the hydrogen ions serially generated in a cascade manner.

Further, technology for extending the life of a storage battery by a resonance electromagnetic wave at 32 to 38 terahertz has also been suggested. That is, Patent Literature 2 (JP 2015-201417 A) suggests a life extension device which shortens a charging time by breaking a hydrogen bond of an electrolyte solution by a resonance electromagnetic wave at 32 to 38 terahertz and emitting hydrogen ions and electrons to the electrolyte solution, in view of a problem that when a storage battery is used for a long time, an electrode and the electrolyte solution are oxidized and deteriorated so that charge/discharge efficiency is deteriorated.

Further, a food processing method using a terahertz wave has also been previously suggested. That is, Patent Literature 3 (JP 2014-217348 A) suggests a food processing method, which reduces an unpleasant odor of food and pulls out mellowness and sweetness, including holding the food under a plurality of conditions different in a combination of temperature and humidity, in which the holding of the food is performed while the food is irradiated with terahertz waves in a plurality of different wavelength bands.

Patent Literature 4 (JP 2012-158684 A) relates to an additive for an antifouling coating material and an antifouling coating material containing the additive, and suggests an additive for an antifouling coating material including a mixture of phosphate mineral powder which is a lanthanum-based material constantly emitting negative ions, in order to reduce adhesion of marine organisms to the ship bottom, marine structures, fishing nets, and the like and a silicate mineral emitting ultra far infrared rays of terahertz waves, as a main component, and an antifouling coating material including the additive.

CITATION LIST

Patent Literature

Patent Literature 1: JP 2015-199894 A
Patent Literature 2: JP 2015-201417 A
Patent Literature 3: JP 2014-217348 A

SUMMARY OF INVENTION

Technical Problem

As described above, a terahertz wave is used as one element for improving combustion in an internal combustion engine, extending a battery life, and improving taste of foods. Patent Literature 4 discloses a silicate mineral emitting ultra far infrared rays of terahertz waves. However, the terahertz wave which has been previously used in various fields still has room for development in expressing the best effect in each use.

Therefore, an object of the present invention is to provide a silicate mixture using a silicate mineral for further enhancing an effect obtained by a terahertz wave in various fields, and another object of the present invention is to provide a combustion accelerator for increasing combustion efficiency in combustion engines.

Solution to Problem

In order to solve the above-described problems, the present invention provides a silicate mixture using a silicate mineral emitting ultra far infrared rays of terahertz waves or using an emitting body which emits an electromagnetic wave different from the terahertz wave, and a combustion accelerator using the silicate mixture.

That is, the present invention provides a silicate mixture formed by using a first component including one or two or more materials selected from silicon compounds including silicon, glass, and quartz, or a second component including one or two or more materials selected from materials formed by sintering a silicate mineral at a temperature of 1300° C. or higher and 2000° C. or lower and materials formed of an ore emitting a terahertz wave.

Further, the present invention provides a silicate mixture formed by mixing a first component including one or two or more materials selected from silicon compounds including silicon, glass, and quartz, and a second component of one or two or more selected from materials formed by sintering a silicate mineral at a temperature of 1300° C. or higher and 2000° C. or lower and ores emitting a terahertz wave.

Further, the present invention provides a silicate mixture formed by mixing a first component emitting an electromagnetic wave with a frequency of less than 100 GHz (wave length of more than 3 mm), and a second component emitting a terahertz wave with a frequency of 100 GHz or more and 100 THz or less. The second component is preferably a material which emits an electromagnetic wave with a wavelength of preferably 10 THz or more and 50 THz or less.

As the first component, one or two or more materials selected from silicon compounds including silicon, glass, and quartz, can be used. The silicon compound may be silicon monoxide, silicon dioxide, silicic acid, silicon nitride, silicon carbide, a silicate, silicon tetrachloride, silane, silicone, a silicon resin, cyclic siloxane, an organosilicon compound, or the like, and particularly it is preferred that the silicon compound is a silicate selected from glass, quartz, and crystal. Further, as the first component, materials emitting an electromagnetic wave with a frequency of less than 100 GHz (wavelength of more than 3 mm) can be used.

The silicate mineral forming the second component is a mineral including silicon and oxygen main components, and preferably a mineral produced by crystallizing silicon dioxide is used. The second component can be formed by sintering a silicate mineral at a temperature of 1300° C. or higher and 2000° C. or lower, preferably 1500° C. or higher than 2000° C. or lower, and particularly preferably 1700° C. or higher and 2000° C. or lower, and the silicate mineral can be recrystallized by the sintering. Further, as the second component, a material emitting a terahertz wave derived from an ore can be used.

By using the silicate mixture using the first component and/or the second component, at least any one of the following effects can be instantly obtained: combustion improvement in combustion engines such as an internal combustion engine and an external combustion engine, battery life extension, electrical resistance reduction, beauty promotion, health promotion, and food taste improvement. Particularly, in order to enhance the effect, it is preferred to use a mixture of the first component and the second component. A mixing ratio of the two may be optional, but it is preferred that 10 to 90% by mass of the second component is blended in the total mixture. When a mixture of the first component and the second component is used, a terahertz wave and an electromagnetic wave with a lower frequency than the terahertz wave can be radiated in combination, thereby further enhancing the effect.

In particular, in the silicate mixture of the present invention, multiple components which are derived from silicon and emit electromagnetic waves with different frequencies are combined, thereby making the effect of improving combustion efficiency in an internal combustion engine and reducing electrical resistance remarkable. In this respect, the effect can be obtained by using only the material emitting a terahertz wave, but in order to make the effect remarkable, it is preferred to use two or more materials in combination which are the above-described silicon compound and emit electromagnetic waves with different frequencies, and further, at least one of the materials is preferably a material emitting a terahertz wave.

Further, the first component and the second component can be formed to have a particle size of 150 μm or less, preferably 100 μm or less, and particularly preferably 50 μm or less, using a pulverizer such as a ball mill. By using the silicate mixture having such a particle size, a surface area in a unit mass can be increased, and an emission amount of the electromagnetic wave including the terahertz wave can be increased. As a result, at least any one of the following effects can be instantly obtained: combustion improvement in combustion engines such as an internal combustion engine and an external combustion engine, battery life extension, electrical resistance reduction, beauty promotion, health promotion, and food taste improvement.

Then, the silicate mixture is mixed with an organic or inorganic solvent, whereby the silicate mixture can be made into a solution state. Thus, the silicate mixture can be used as a coating material, and can be used by applying the silicate mixture to various articles.

Further, the silicate mixture can be formed in a solid state by kneading the silicate mixture with at least any one of molten metal, resin, and ceramics and solidifying the mixture. Thus, the silicate mixture can be formed into various shapes such as a block shape and a sheet shape and can be pasted to various articles, and also, can be used by introducing the silicate mixture into a liquid material. Further, vehicles, electrical products, storage goods, and other articles and parts thereof can also be manufactured from metals, resins, or ceramics kneaded with the silicate mixture.

Further, in the silicate mixture according to the present invention, carbon powder can be further blended. The carbon powder can be formed to have a particle size of 150 μm or less, preferably 100 μm or less, and particularly preferably 50 μm or less, using a pulverizer such as a ball mill, like the first component and the second component. Further, it is preferred that the carbon powder is particularly coal dust. For example, charcoal, bamboo charcoal, coal, activated carbon, and the like can be pulverized and used as the carbon powder. By blending the carbon powder, at least any one of the following effects can be instantly obtained: combustion improvement in combustion engines such as an internal combustion engine and an external combustion engine, battery life extension, electrical resistance reduction, beauty promotion, health promotion, and food taste improvement.

Further, in order to solve at least any one of the above problems, the present invention provides a combustion accelerant formed using the silicate mixture according to the present invention. That is, the present invention provides a combustion accelerator for improving combustion efficiency in a combustion engine, in which the silicate mixture according to the present invention is used as the combustion accelerator, and the second component emits a terahertz wave with a frequency of 100 GHz or more and 100 THz or less and the first component emits an electromagnetic wave with a frequency of less than 100 GHz (wavelength of more than 3 mm), and thus improving combustion efficiency in the combustion engine.

The combustion accelerator can be formed by dispersing the powdery silicate mixture in an organic or inorganic solvent, and also formed by kneading the powdery silicate mixture with at least any one of molten metal, resin, and ceramics.

In order to solve the above problems, the present invention provides a method of promoting combustion efficiency in an apparatus including a combustion engine and a fuel tank for storing fuel to be supplied to the combustion engine, the method including: applying a liquid combustion accelerator formed by dispersing the first component and the second component in an organic or inorganic solvent, which is the combustion accelerator, to at least any one part of a fuel supply system and a combustion air supply system in the combustion engine, and introducing a solid combustion accelerator formed by kneading the first component and the second component with at least any one of metal, resin, and ceramics into the fuel tank.

Further, the present invention provides an electrical component formed using the silicate mixture according to the present invention. That is, an electrical component incorporated or coated with the silicate mixture, in which the silicate mixture is the silicate mixture according to the present invention, is provided. The electrical component may be electrical products, wiring, electrical circuits, batteries, and the like, and can be formed by applying a coating material including the silicate mixture to these products or kneading the silicate mixture with resin, metal, and ceramics constituting the electrical component.

Advantageous Effects of Invention

According to the silicate mixture of the present invention, the effects which can be obtained in various fields, for example, at least any one of the following effects can be instantly obtained: combustion improvement in combustion engines such as an internal combustion engine and an external combustion engine, battery life extension, electrical resistance reduction, beauty promotion, health promotion, and food taste improvement. Moreover, the effect can be instantly obtained; for example, in the case of a coating material including the silicate mixture, the effect can be obtained simultaneously with the application thereof.

Further, according to the present invention, in each application using a terahertz wave used in various fields, an effect which can be obtained by a terahertz wave can be enhanced and expressed, and a silicate mixture to further enhance the effect which can be obtained by a terahertz wave in various fields, and a combustion accelerator using the silicate mixture can be provided.

BRIEF DESCRIPTION OF DRAWINGS

FIG. 4 is an inspection table that shows results of inspecting automobile exhaust gas before application of the combustion accelerant.

FIG. 5 is an inspection table that shows results of inspecting automobile exhaust gas after application of the combustion accelerant.

FIG. 6 is an emission gas test result report before application of a coating material including the silicate mixture in Experimental Example 14.

FIG. 7 is an emission gas test result report after application of a coating material including the silicate mixture in Experimental Example 14.

DESCRIPTION OF EMBODIMENTS

Figure 1:
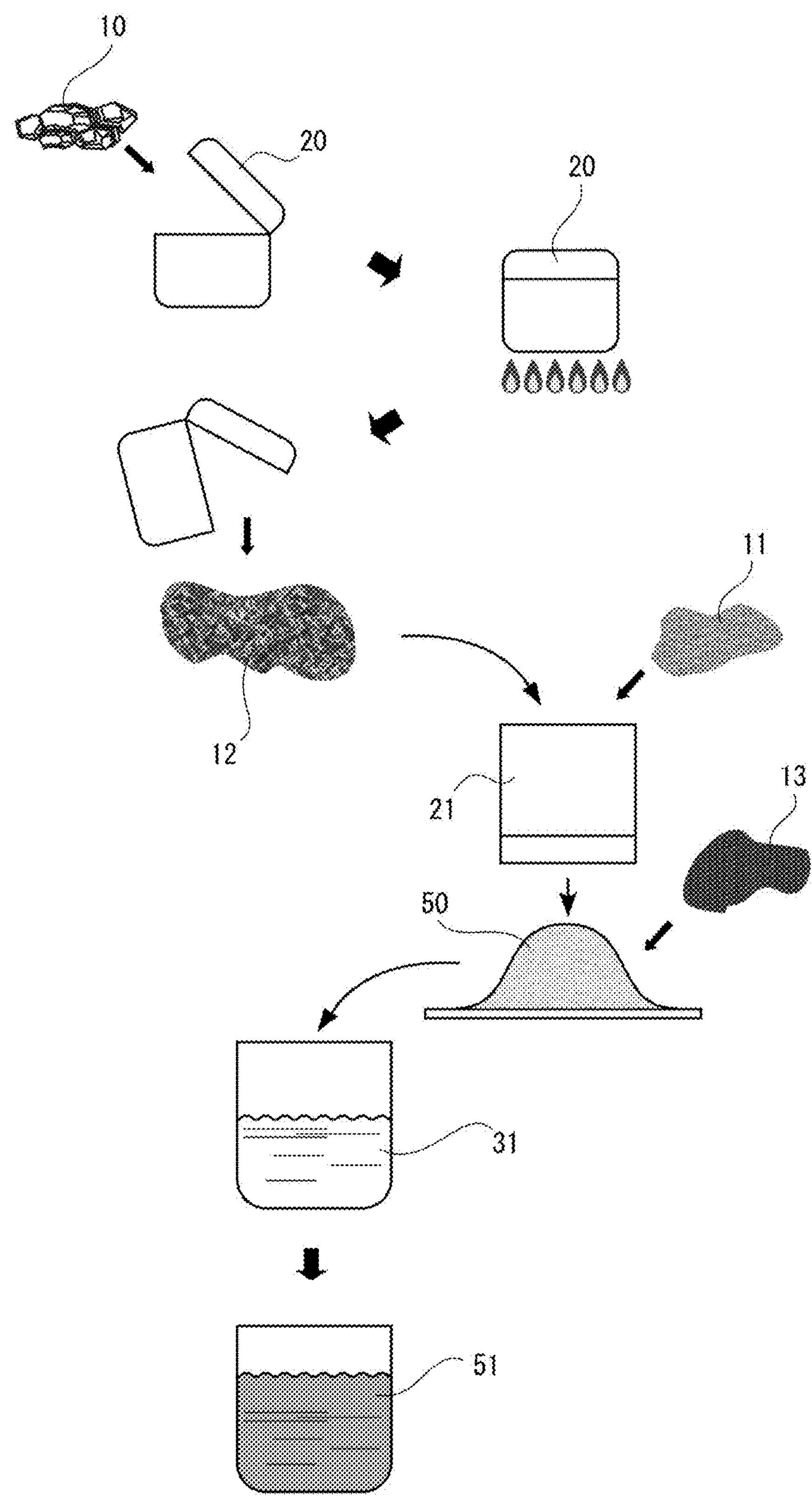
FIG. 1 is a flowchart that illustrates a production step of a silicate mixture according to a first embodiment.
Figure 2:
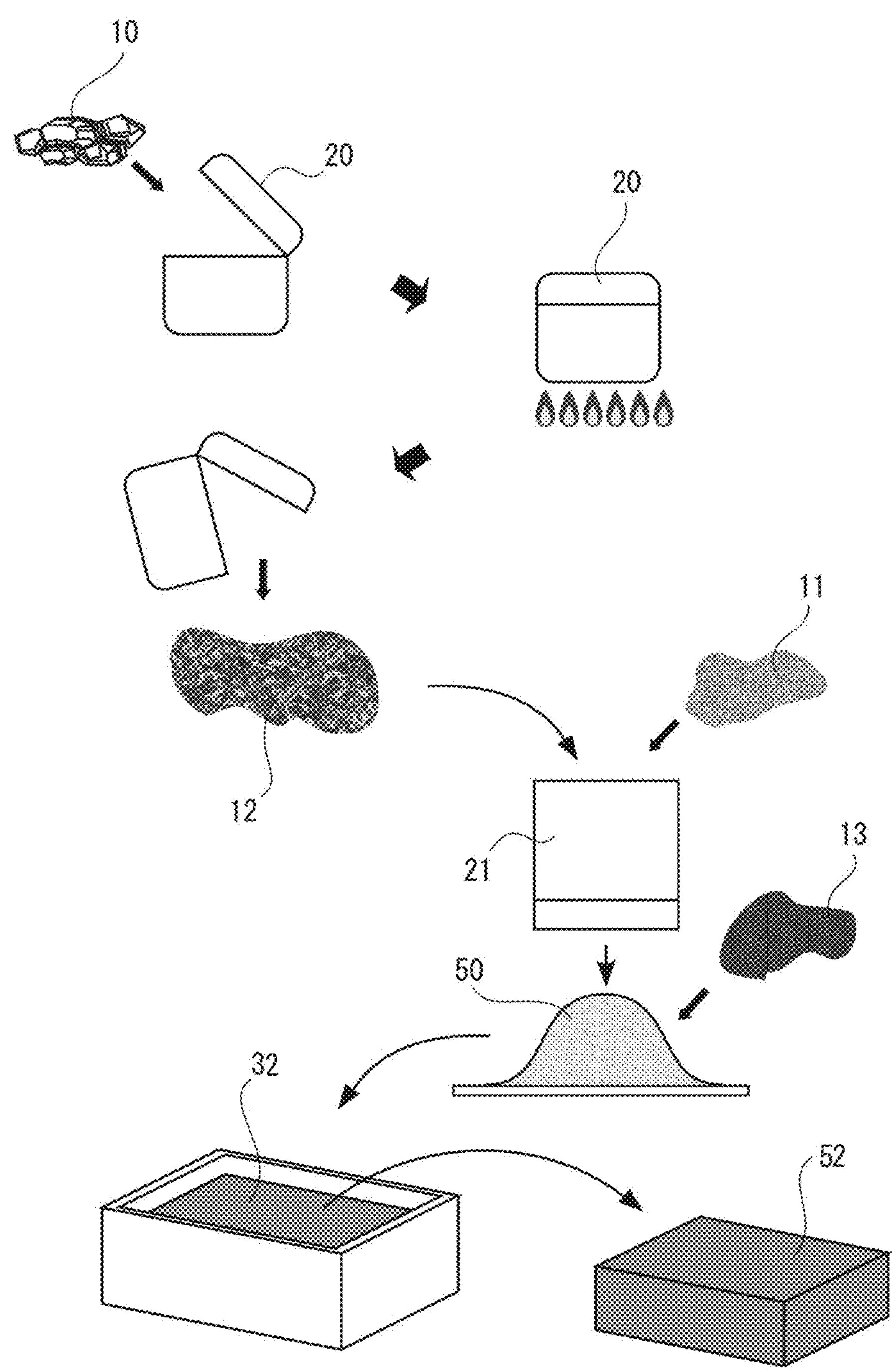
FIG. 2 is a flowchart that illustrates a production step of a silicate mixture according to a second embodiment.

Hereinafter, a silicate mixture 50 using a silicate mineral 10 according to the present embodiment and a method of producing the same will be described in detail, referring to the drawings. FIG. 1 is a flowchart in a method of producing a silicate mixture 50 according to a first embodiment, and FIG. 2 is a flowchart in a method of producing a silicate mixture 50 according to a second embodiment.

First Embodiment

First, a silicate mixture 50 using a silicate mineral 10 according to the first embodiment and a method of producing the same will be described in detail, referring to the flowchart of FIG. 1. The silicate mixture 50 using the silicate mineral 10 according to the present embodiment is a mixture of a first component 11 including one or two or more materials selected from silicon compounds including silicon, glass, and quartz, and a second component 12 including one or two or more materials selected from materials formed by sintering a silicate mineral 10 at a temperature of 1300° C. or higher and 2000° C. or lower and ores emitting a terahertz wave.

As the first component 11, it is preferred to use a material emitting an electromagnetic wave with a frequency of less than 100 GHz (wavelength of more than 3 mm), particularly at −30° C. or higher.

The second component 12 used in this mixing step can be formed by sintering a silicate mineral 10 at a temperature of 1300° C. or higher and 2000° C. or lower, using a sintering device 20 such as an electric furnace. In particular, in the present embodiment, the silicate mineral 10 was sintered at 1500° C. By sintering the silicate mineral 10 at 1300° C. or higher and 2000° C. or lower as such, the silicate mineral can become a material emitting a terahertz wave with a frequency of 100 GHz or more and 100 THz or less.

The silicate mineral 10 is classified as a nesosilicate mineral, a sorosilicate mineral, a cyclosilicate mineral, an inosilicate mineral, a layered (phyllo) silicate mineral, and a tectosilicate mineral, based on a crystal structure. In addition, some are classified as a fibrous silicate mineral referred to as asbestos, based on a classification standard different from the crystal structure.

The silicate mineral 10 can be used in a solid or powder state, and this can be sintered to recrystallize the corresponding silicate mineral 10, whereby an ore component including high-purity silicon can be precipitated.

Further, as the second component 12, the silicate mineral 10 which is naturally produced and emits a terahertz wave with a frequency of 100 GHz or more and 100 THz or less, can be used. The silicate mineral 10 emitting a terahertz wave can be selected from those commercially available as terahertz ores. Further, as the silicate mineral 10, an ore emitting an electromagnetic wave with a wavelength of 15 to 1,000 μm (intermediate band between a radio wave and a light wave), which is an ore mined from a mine at the foot of a mountain in Kyushu Takachiho in Japan, can be used. As a result of measuring components contained in the silicate mineral 10 using fluorescent X-ray analysis equipment of System3270E from Rigaku Electronics, the element components are Si, Al, K, Fe, Ca, Na, Zr, Mg, Ti, Mn, P, Sr, Cl, Y, S, Cr, Rb, Zn, and Pb.

Then, the second component 12 including an artificial tera ore processed to emit a terahertz wave by sintering and recrystallizing the silicate mineral 10 as described above, or a natural ore emitting a terahertz wave is mixed with the first component 11.

At the time of the mixing, in the present embodiment, in order to disperse the first component 11 and the second component 12 evenly and to increase a surface area of each component, the first component 11 and the second component 12 can be formed to have a particle size of 150 μm or less, preferably 100 μm or less, and particularly preferably 50 μm or less, using a pulverizer 21 such as a ball mill. These particle sizes can be specified by a "sieving method" by a test sieve opening. In particular, in the present embodiment, the components are formed to have the particle size (particle size of 38 μm or less) which passes a 400 mesh sieve, preferably a 700 mesh sieve, based on JISZ8801-1:2006. For the pulverization, various pulverizers such as a ball mill can be used. By pulverization to the particle size, at least any one of the following effects can be instantly obtained: combustion improvement in combustion engines such as an internal combustion engine and an external combustion engine, battery life extension, beauty promotion, health promotion, and food taste improvement.

In the present embodiment, in addition to the first component 11 and the second component 12, further the silicate mixture 50 is formed by blending carbon powder 13 having a particle size which passes through a 400 mesh sieve based on JISZ8801-1:2006. As the carbon powder 13, for example, that obtained by pulverizing charcoal, bamboo charcoal, coal, activated carbon, and the like can be used. Since the carbon powder 13 can emit an electromagnetic wave such as a far infrared ray by heating the carbon powder to a certain temperature or higher, at least any one of the following effects can be instantly obtained by blending the carbon powder 13: combustion improvement in combustion engines including an internal combustion engine and an external combustion engine, battery life extension, electrical resistance reduction, beauty promotion, health promotion, and food taste improvement.

Then, since it is difficult to apply a powdery silicate mixture 50 formed as described above to various combustion engines, electrical equipment, electrical components, or the like as it is, the silicate mixture 50 according to the present embodiment is processed so that it is easy to use the silicate mixture.

In particular, in the present embodiment, the silicate mixture 50 formed in a powder state is kneaded with and dispersed in an organic or inorganic solvent 31. Thus, a solution 51 in which the silicate mixture 50 is dispersed can be applied to various machines, instruments, and the like by coating and can be used like a coating material.

The solvent 31 which disperses the powdery silicate mixture 50 may be an inorganic solvent or an organic solvent, but is preferably an inorganic solvent such as water, considering storage stability and the like. Further, when an acrylic solvent is used, the silicate mixture becomes a floc state or a dumpling state, and it becomes difficult to disperse the silicate mixture, and thus, a silicon-based solvent is preferred. A dispersion ratio of the mixed powder may be optional, but it is preferred to adjust the viscosity so that the dispersion can be applied to a combustion engine or the like.

By applying a coating material 51 blended with the silicate mixture, at least any one of the following effects can be obtained: combustion improvement in combustion engines including an internal combustion engine and an external combustion engine, battery life extension, electrical resistance reduction, beauty promotion, health promotion, and food taste improvement.

Since currently, it is difficult to measure the electromagnetic wave, it is difficult to clarify the mechanism (principle) in the present embodiment, but it is considered that the electromagnetic wave such as a terahertz wave emitted from the silicate mixture 50 is involved in the above-described effects. That is, it is considered to be due to an intramolecular influence, such as clustering of molecules of various participating components such as air and fuel, by emitting a terahertz wave in a region between a light wave and a radio wave. Further, it is known that the terahertz radiation has a characteristic of transmitting cloth, paper, wood, plastic, and ceramics, without penetrating a conductor with a non-ionized submillimeter wave radiation. In the present embodiment, it can be presumed that by blending the first component 11 and the carbon powder 13 in addition to the second component 12 emitting the terahertz wave and further pulverizing and mixing the components so that they have a predetermined particle size, an output wavelength in the electromagnetic wave in the terahertz region is optimized, and at least any one of the following effects can be obtained: combustion improvement in the combustion engines, battery life extension, electrical resistance reduction, beauty promotion, health promotion, and food taste improvement.

In addition, a blending ratio of the first component 11, the second component 12, and the carbon powder 13 may be optional, but a blending amount of the first component 11 and the second component 12 is 50% by mass or more of an active component in the silicate mixture 50, and further, it is preferred that the first component 11 and the second component 12 are blended in almost equal amounts.

Second Embodiment

Second, a silicate mixture 50 using a silicate mineral 10 according to the second embodiment and a method of producing the same will be described in detail, referring to the flowchart of FIG. 2. In a method of producing the silicate mixture 50 using the silicate mineral 10 according to the present embodiment, like the first embodiment, the first component 11 and the second component 12 are mixed to produce the silicate mixture 50, and further the first component 11 and the second component 12 are pulverized to a particle size passing through a 400 mesh sieve, preferably a 700 mesh sieve based on JISZ8801-1:2006, and also the carbon powder 13 is blended to form the silicate mixture.

Then, in the present embodiment, by blending and mixing the thus-formed silicate mixture 50 in a powder state with a molten material 32 such as resin and metal in a molten state, and solidifying the mixture, a solid silicate mixture 52 using the silicate mineral 10 according to the present embodiment can be produced. The silicate mixture 52 formed in a solid state by this solidification (change into solid) can be formed into a block shape in addition to a plate shape, and further can be formed in a cylinder shape for increasing a surface area. Further, when the first component 11, the second component 12, and the carbon powder 13 are kneaded with respect to the molten material 32 such as resin and metal in a molten state, the mixture can be configured so that the mixture powder exists a lot on a surface side.

The solid silicate mixture 52 formed as described above can be used by introducing the mixture to a liquid material, for example, by introducing the mixture to a fuel tank, a hydroponic culture medium, a sewage tank, or the like. Further, the solid silicate mixture 52 can be formed in the shape of various parts, whereby a part in which the silicate mixture 52 is incorporated can be manufactured.

Since the solid silicate mixture 52 is also blended with the first component 11 and the carbon powder 13, in addition to the second component 12 including an artificial or natural ore emitting a terahertz wave, and further these are pulverized to a predetermined particle size and mixed, it can be presumed that an output wavelength in the terahertz wave is optimized. As a result, at least any one of the following effects can be instantly obtained: combustion improvement in the internal combustion engine, battery life extension, electrical resistance reduction, beauty promotion, health promotion, and food taste improvement.

In particular, in the present embodiment, when the powdery silicate mixture 50 is kneaded with a resin 32, the terahertz wave emitted from the silicate mixture 50 is emitted through the resin 32, and thus, the above-described effects can be enhanced.

Further, when the silicate mixture 50 is kneaded with a metal 32, the metal itself can also be a terahertz wave emitter by the terahertz wave emitted from the silicate mixture 50, or the terahertz wave is emitted from the silicate mixture 50 present on a metal surface, thereby enhancing the above-described effect.

Third Embodiment

Figure 3:
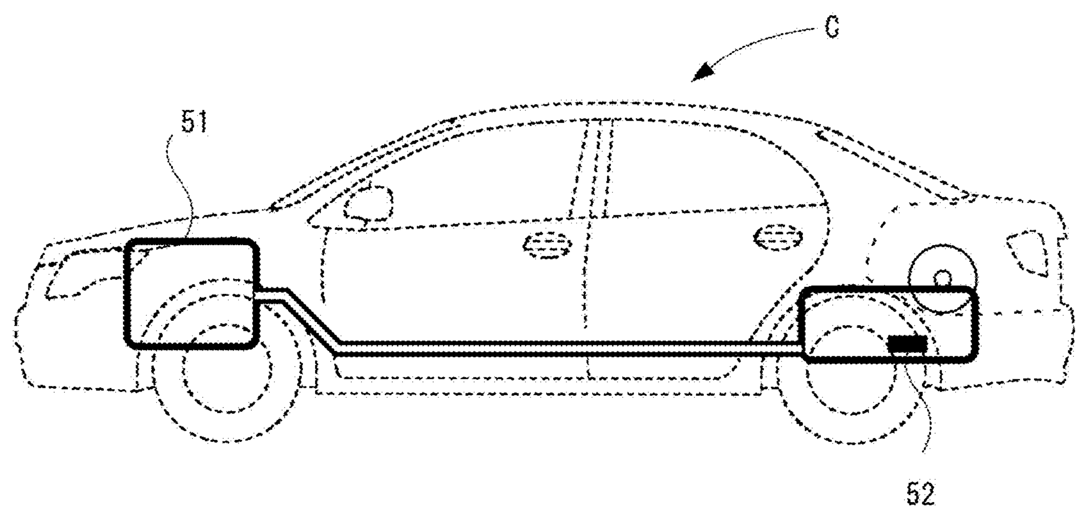
FIG. 3 is a schematic diagram that illustrates a state in which a combustion accelerant is installed in a vehicle.

In the present embodiment, an embodiment in which the liquid silicate mixture 50 shown in the first embodiment and the solid silicate mixture 50 shown in the second embodiment are used as a combustion accelerator 51 or 52, is shown. FIG. 3 is a side view showing a state in which the combustion accelerator 51 or 52 is installed in an automobile C.

That is, for the combustion accelerator 51 or 52 according to the present embodiment, a solid combustion accelerator 52 is introduced into a fuel tank of the vehicle, and further a liquid combustion accelerator 51 is applied to a fuel supply line and/or an air supply line for combustion in the vehicle. In particular, the liquid combustion accelerator 51 can be applied to a fuel pipe, an intake manifold, a radiator hose, a battery, and the like in the vehicle.

Thus, in the vehicle C in which the combustion accelerator 51 or 52 is installed, electrical efficiency is improved, and also fuel and air molecules for combustion are influenced, thereby improving an output of the combustion engine (engine) and maintaining low emission concentrations of NOx and SOx in exhaust gas. Further, since emission concentrations of HC and CO can be greatly decreased, it is effective as an environmental measure. In particular, a coating material including the silicate mixture is applied to an electrical component such as a cable, a battery, and a generator, thereby decreasing electrical resistance and increasing conduction efficiency.

In addition, regarding the vehicle according to the third embodiment, the combustion accelerator according to the present embodiment can also be used in a heat engine using gasoline, kerosene, jet fuel, light oil, heavy oil, LPG, NPG, city gas, alcohol, or the like as fuel. Further, since the coating material including the silicate mixture can reduce vibration during operation of the combustion engine (engine) by stabilizing combustion efficiency or the like, the coating material is applied to, for example, an engine or shaft of a ship to reduce the vibration of the ship.

Example 1

In the following, in order to confirm the effect of the silicate mixture shown in the first and second embodiments, experiments were performed. Particularly in Examples 1 to 10, a silicate mixture using a silicate mineral was used as a combustion accelerator, and thus, the silicate mixture according to the first embodiment was applied to a fuel supply line and a combustion air suction line in an internal combustion engine, and the silicate mixture according to the second embodiment was introduced into a fuel tank. Then, an effect of improving combustion efficiency at the time of applying the combustion accelerator was confirmed. Hereinafter, for each vehicle used in the present experiment, the effect is disclosed.

In addition, the silicate mixture used in the present Example used glass powder obtained by pulverizing glass as a first component, and terahertz ore powder obtained by pulverizing a silicate mineral emitting a terahertz wave with a frequency of 100 GHz to 100 THz as a second component. Further, the first component and the second component were used in substantially the same volume. As a coating material including the silicate mixture, a coating material obtained by incorporating 10% by mass or more of the silicate mixture to an aqueous solvent was used.

Experimental Example 1

Test date: Feb. 22, 2017

Vehicle used: 0.2 m3 backhoe manufactured by Hitachi Construction Machinery Co., Ltd.

Fuel: diesel

Effect: by applying the combustion accelerant, even when a load was applied, it was visually confirmed that the exhaust gas was white and a graphite component was decreased.

Experimental Example 2

Test date: Feb. 22, 2017

Vehicle used: Land Cruiser 80, 4.2VX Limited manufactured by TOYOTA MOTOR CORPORATION, diesel turbo 4WD, 1993, mileage of 180,000 km Fuel: diesel Effect: before application, the exhaust gas of the vehicle was black, but by applying the combustion accelerant, it was visually confirmed that the exhaust gas became white and a graphite component was decreased. Further, the noise unique to the diesel engine was reduced and the engine sound was quieter.

Experimental Example 3

Test date: Dec. 27, 2015

Vehicle used: Land Cruiser Prado, 3,000 cc diesel engine, manufactured by TOYOTA MOTOR CORPORATION, mileage of 398,000 km Fuel: diesel Effect: the exhaust gas which was black smoke before application was changed to water vapor after application, and exhaust gas odor disappeared. In addition, in the inside, the engine sound became quieter so that the sound was not noticed while driving.

Experimental Example 4

Test date: Dec. 1, 2016

Vehicle used: Land Cruiser Prado, 3,000 cc diesel engine, manufactured by TOYOTA MOTOR CORPORATION, mileage of 411,000 km (the same vehicle as Experimental Example 3)

Fuel: diesel

Effect: as a result of further application, the noise unique to the diesel engine disappeared even under an environment of an outside temperature of 4° C., so that it became even quieter. In addition, the exhaust gas was water vapor by burning the causative substance of black smoke.

Experimental Example 5

Vehicle used: Carry (lightweight truck) manufactured by SUZUKI MOTOR CORPORATION, 660 cc gasoline engine Fuel: gasoline Effect: before application, black smoke was contained in the exhaust gas, and was emitted to the extent to be visually confirmed. After application, when the engine speed was increased multiple times, sludge and the like deposited inside the engine from the exhaust gas was emitted.

Experimental Example 6

Vehicle used: Tire Shovel manufactured by TCM CORPORATION

Fuel: diesel

Effect: before application, the exhaust gas was black and the engine made a rattling sound, but after application, the black smoke in the exhaust gas was greatly reduced and the engine sound was stable.

Experimental Example 7

Test date: Feb. 22, 2017

Vehicle used: snowplow (10 hp diesel engine) manufactured by YANASE SANKI CO. LTD.

Fuel: diesel

Effect: before application, the exhaust gas was black, but after application, the black smoke in the exhaust gas was greatly reduced. In particular, immediately after starting instruction, the engine was taken to full power and a load was applied, but the exhaust was colorless.

Experimental Example 8

Test date: Jun. 18, 2016

Vehicle used: ODYSSEY manufactured by Honda Motor Co., Ltd.

Fuel: gasoline

Effect: before application, an HC (carbon monoxide) amount in the exhaust gas was 10 ppm, but after application, an HC (carbon monoxide) amount in the exhaust gas was decreased to 1 ppm. In addition, the engine sound was changed and blow-up was also improved.

Experimental Example 9

Test date: Jun. 6, 2016

Vehicle used: Golf R32 manufactured by Volkswagen AG, displacement of 3,188 cc

Fuel: gasoline

Effect: before application, an HC (carbon monoxide) amount in the exhaust gas was 466 ppm and CO (carbon monoxide) was 2.05% by volume, but after application, an HC (carbon monoxide) amount in the exhaust gas was decreased to 7 ppm and CO (carbon monoxide) was decreased to 0.00% by volume. In addition, the engine sound was changed and blow-up was also improved.

Experimental Example 10

In this experiment, pollutants in the exhaust gas were inspected in the inspection of automobile inspection in China. FIG. 4 is an inspection table that shows inspection results before application of the combustion accelerator according to the present embodiment, and FIG. 5 is an inspection table that shows inspection results after application of the combustion accelerator according to the present embodiment.

As seen from the results of this Example, CO (carbon monoxide) in the exhaust gas was decreased and an emission amount of NO (nitrogen monoxide) was also at or below the determination reference, by applying the combustion accelerator according to the present embodiment.

Example 2

Experimental Example 11

In Experimental Example 11, an experiment to confirm battery life extension was performed. That is, in a LED lighting fixture using an alkaline battery, a lighting fixture (flashlight) in which the LED is not lit by consumption of a dry battery was prepared. Then, the liquid silicate mixture according to the first embodiment was applied to a case of a battery housing portion in the lighting fixture. As a result, LED which was not lit due to the power reduction of the dry battery before application, was lit by application of the silicate mixture. Further, the same experiment was performed by splicing the solid silicate mixture according to the second embodiment, and likewise, the LED was lit by splicing the solid silicate mixture.

Example 3

Experimental Example 12

In this experiment, an effect of applying a coating material including the silicate mixture was confirmed in a hybrid vehicle. The experimental situation is as follows.

"Test vehicle": Honda Insight (first year registration 2000, mileage of 125,000 km)

"Experimental method"

After traveling 100 km in the city, change in fuel consumption and charge voltage was inspected before and after application of the coating material including the silicate mixture.

The application part of the coating material including the silicate mixture was an air cleaner box (outside and inside), a hose entering a throttle body from the case, a throttle body entrance, a fuel main hose from a fuel pump coming from an engine room, an injector line after the pressure regulator, an intake manifold, an upper portion of an injector (three for three cylinders), PGM Fi (main ECU), a fuse box, input and output terminals from ECU, a supply main harness from a hybrid battery in an engine room, input/output and earth lines, an integrated motor assist (IMA) unit battery inside a trunk, and input/output supply main harness to an engine side.

"Experimental Result"

In the above experimental results, the fuel consumption was 26 km/L before application, but the fuel consumption was improved to 29.8 km/L after application. Further, the charge voltage was 12.5 V before application, but the charge voltage was improved to 13.8 V after application.

In addition, the experimenter has reported that the following effects were obtained by applying the coating material including the silicate mixture.

Engine noise reduction and vibration reduction at the time of idling (but the idling speed was not changed before and after application)

Increase in idle exhaust pressure

Water vapor emission from a muffler at an outside temperature of 22° C.

Decrease in acceleration time lag from a stationary state to transmission

Increased response in a low/medium speed range during traveling

Decrease in vibration at each engine speed

Reduced battery charge recovery time during battery-off regenerative brake

Increased motor assist power at the time of acceleration

Warm-up time reduction

Reduced frequency of rotation of a fan motor with a radiator fine switch (effect of reducing battery consumption)

Example 4

Experimental Example 13

In this experiment, an effect of improving electrical resistance by applying the coating material including the silicate mixture was confirmed for an automobile. The experimental situation is as follows.

"Test vehicle": Subaru Outback (first year registration 2003, mileage of 13,758 km)

"Experimental Method"

The voltage was measured by a circuit tester. The voltage was measured under no load without operating electrical equipment such as audio equipment and an air conditioner in a vehicle, in an idling state. Further, measurement of a water temperature was restarted after an electric fan was warmed up until the electric fan turned, and then was operated again. At that time, the measurement was not performed for 2 minutes after the operation of the electric fan was stopped. In addition, a positive side of a circuit tester was connected to an alternator S terminal and a negative side thereof was connected to a negative side of a battery.

Then, the coating material including the silicate mixture was applied to harness which was connected to the alternator main body, the alternator S terminal, and the alternator S terminal.

"Experimental Result"

Before applying the coating material including the silicate mixture, the voltage of the circuit tester was 14.12 V to 14.13 V. After applying the coating material including the silicate mixture, the voltage of the circuit tester was 14.04 V. From this result, it was confirmed that the voltage was decreased by applying the coating material including the silicate mixture, and as a result, the resistance value was decreased and the current value was increased. That is, the vehicle was provided with an IC regulator, which keeps the power constant. Thus, the decreased voltage value represents an increased current value and at the same time a decreased electrical resistance value.

Example 5

Experimental Example 14

In this experiment, changes in exhaust gas by applying the coating material including the silicate mixture were carried out in Japan Automobile Transport Technology Association (Akishima Laboratory). The test results are shown in FIGS. 6 and 7. That is, FIG. 6 shows a diesel automobile 10·15 mode emission gas test result report before application of the coating material including the silicate mixture, and FIG. 7 shows a diesel automobile 10·15 mode emission gas test result report after application of the coating material including the silicate mixture. Naturally, the vehicle used in this test was the same vehicle as indicated in each of the reports.

The coating material including the silicate mixture was applied to sensors, catalysts, a diesel particulate filter (DPF), an exhaust recirculation system (EGR), a secondary air path, and the like.

As shown in the test result section of FIGS. 6 and 7, from the results of this experiment, the following changes were confirmed by the application of the coating material of the silicate mixture.

"Emission amount of carbon monoxide (CO)" was significantly decreased from 0.068 g/km before application to 0.026 g/km after application.

"Emission amount of hydrocarbon (HC)" was decreased from 0.033 g/km before application to 0.032 g/km after application.

"Emission amount of nitrogen oxides (NOx)" was increased from 0.612 g/km before application to 0.699 g/km after application.

However, after traveling about 1,000 km after application, the emission amount of nitrogen oxides (NOx) was significantly smaller than the emission amount before application.

"Emission amount of carbon dioxide (CO2)" was decreased from 125.7 g/km before application to 124.1 g/km after application.

"Emission amount of particulate material" was decreased from 0.027 g/km before application to 0.017 g/km after application.

INDUSTRIAL APPLICABILITY

The silicate mixture of the present invention can be used for combustion improvement in combustion engines including an internal combustion engine and an external combustion engine, battery life extension, electrical resistance reduction, beauty promotion, health promotion, and food taste improvement.

REFERENCE SIGNS LIST

10 Silicate mineral
11 First component
12 Second component
13 Carbon powder
20 Sintering device
21 Pulverizer
31 Solvent
32 Molten material
50 Silicate mixture
51 Coating material
52 Solid silicate mixture

The invention claimed is:

1. A method for producing a silicate mixture composition, comprising: mixing a first component and a second component, wherein the first component includes one or two or more materials selected from silicon compounds including silicon, glass, and quartz, the second component includes a material formed by sintering a silicate mineral at a temperature of 1300° C. or higher and 2000° C. or lower, and the second component is blended at 10 to 90% by mass in the silicate mixture composition.

2. The method according to claim 1, wherein the first component emits an electromagnetic wave with a frequency of less than 100 GHz.

3. The method according to claim 1, wherein the first component and the second component are formed to have a particle size of 150 μm or less, and the first component and the second component are dispersed in an organic or inorganic solvent or are kneaded with at least any one of metals, resins, or ceramics.

4. The method according to claim 1, wherein the silicate mixture composition is further blended with carbon powder having a particle size of 150 μm or less.

5. A method for producing a combustion accelerator for improving combustion efficiency in a combustion engine, comprising:

preparing a silicate mixture by the method according to claim 1 as the combustion accelerator, wherein the first component emits an electromagnetic wave with a frequency of less than 100 GHz and the second component emits a terahertz wave with a frequency of 100 GHz or more and 100 THz or less, and thus improving combustion efficiency in the combustion engine.

6. A method of promoting combustion efficiency in an apparatus including a combustion engine and a fuel tank for storing fuel to be supplied to the combustion engine, the method comprising:

preparing a combustion accelerator by the method according to claim 5, applying, to at least any one part of a fuel supply system or a combustion air supply system in the combustion engine, a liquid combustion accelerator formed by dispersing the combustion accelerator in an organic or inorganic solvent; and introducing, into the fuel tank, a solid combustion accelerator formed by kneading the combustion accelerator with at least any one of metal, resin, or ceramics.

7. A method comprising:

preparing a silicate mixture by the method according to claim 1, and incorporating or coating an electrical component with the silicate mixture.

* * * * *